(12) United States Patent
Yoon

(10) Patent No.: US 11,225,405 B2
(45) Date of Patent: Jan. 18, 2022

(54) LIQUID DISPENSER

(71) Applicant: LG ELECTRONICS INC., Seoul (KR)

(72) Inventor: Shic Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 419 days.

(21) Appl. No.: 16/033,492

(22) Filed: Jul. 12, 2018

(65) Prior Publication Data
US 2018/0319648 A1 Nov. 8, 2018

Related U.S. Application Data

(62) Division of application No. 15/200,214, filed on Jul. 1, 2016, now Pat. No. 10,053,349.

(30) Foreign Application Priority Data

Aug. 21, 2015 (KR) .......................... 10-2015-0118211

(51) Int. Cl.
*B67D 1/00* (2006.01)
*B67D 1/08* (2006.01)
(Continued)

(52) U.S. Cl.
CPC .......... *B67D 1/0004* (2013.01); *B67D 1/0081* (2013.01); *B67D 1/08* (2013.01);
(Continued)

(58) Field of Classification Search
CPC .... B67D 1/004; B67D 1/0872; B67D 1/0004; B67D 1/0081; B67D 1/08; B67D 1/0864; B67D 1/0888; B67D 1/0895; B67D 1/16; B67D 2210/00031; B67D 2210/0088; B67D 2210/00039; B67D 2210/00044; B67D 2210/00049; B67D 2210/00062; B67D 2210/00094; B67D 2210/00118; E03C 1/0404; B67C 2210/00031;
(Continued)

(56) References Cited

U.S. PATENT DOCUMENTS 1,767,438 A 6/1930 Dranter et al.
1,834,222 A 12/1931 Ronk
(Continued)

FOREIGN PATENT DOCUMENTS

CN 1604872 4/2005
CN 1781419 6/2006
(Continued)

OTHER PUBLICATIONS

Chinese Office Action dated Oct. 10, 2020 issued in Application 201811531602.4 and English translation.
(Continued)

*Primary Examiner* — Andrew D StClair
(74) *Attorney, Agent, or Firm* — KED & Associates, LLP

(57) ABSTRACT

A water dispenser is provided. The water dispenser may include a main body, a rotator installed to be rotatable in a horizontal direction in the main body and including a water discharger, a rotation guide rail having a predetermined curvature within the main body, and a rotation guide protrusion provided in the rotator and slidably coupled to the rotation guide rail to guide rotation of the rotator.

18 Claims, 17 Drawing Sheets

(51) Int. Cl.
  *B67D 1/16* (2006.01)
  *C02F 1/00* (2006.01)
(52) U.S. Cl.
  CPC ......... *B67D 1/0864* (2013.01); *B67D 1/0888* (2013.01); *B67D 1/0895* (2013.01); *B67D 1/16* (2013.01); *B67D 2001/0088* (2013.01); *B67D 2210/00031* (2013.01); *B67D 2210/00039* (2013.01); *B67D 2210/00044* (2013.01); *B67D 2210/00049* (2013.01); *B67D 2210/00062* (2013.01); *B67D 2210/00094* (2013.01); *B67D 2210/00118* (2013.01); *C02F 1/003* (2013.01); *C02F 2307/10* (2013.01)
(58) Field of Classification Search
  CPC .. B67C 2210/0088; B67C 2210/00039; B67C 2210/00044; B67C 2210/00049; B67C 2210/00062; B67C 2210/00094; B67C 2210/00118
  See application file for complete search history.

(56) References Cited

U.S. PATENT DOCUMENTS

| | | | |
|---|---|---|---|
| 1,878,523 | A | 9/1932 | Johnson |
| 3,115,267 | A | 12/1963 | Whitman |
| 4,469,150 | A * | 9/1984 | Grimaldi ............... B67D 1/06 141/198 |
| 4,811,870 | A * | 3/1989 | Bianco ............... B65D 25/2894 222/461 |
| 5,146,832 | A | 9/1992 | Wilson et al. |
| 5,481,790 | A | 1/1996 | Koreis et al. |
| 6,193,089 | B1 | 2/2001 | Yu |
| 6,315,607 | B1 | 11/2001 | Hwang et al. |
| 7,645,381 | B2 * | 1/2010 | Oranski ............... B67D 1/0895 210/198.1 |
| 7,913,401 | B2 | 3/2011 | Iocona |
| 8,863,395 | B2 | 10/2014 | Alliss |
| 2003/0201269 | A1 | 10/2003 | Calder |
| 2003/0218043 | A1 | 11/2003 | Cooper et al. |
| 2006/0291826 | A1 | 12/2006 | Hafer et al. |
| 2007/0102344 | A1 | 5/2007 | Konrad |
| 2007/0214655 | A1 | 9/2007 | Arnetoli |
| 2008/0249473 | A1 | 10/2008 | Rutti et al. |
| 2008/0302487 | A1 | 12/2008 | Goodman et al. |
| 2008/0314065 | A1 * | 12/2008 | Kim ............... F25D 23/028 62/389 |
| 2009/0236364 | A1 | 9/2009 | Njaastad et al. |
| 2010/0072230 | A1 * | 3/2010 | Hatch ............... B65D 25/46 222/534 |
| 2010/0243542 | A1 | 9/2010 | Burba et al. |
| 2011/0036789 | A1 | 2/2011 | Richardson et al. |
| 2012/0046652 | A1 | 2/2012 | Sokel |
| 2012/0066915 | A1 | 3/2012 | Alliss |
| 2012/0222999 | A1 | 9/2012 | Ha et al. |
| 2012/0305605 | A1 * | 12/2012 | Vassaux ............... B67D 1/0005 134/93 |
| 2013/0037469 | A1 | 2/2013 | Harris et al. |
| 2013/0213238 | A1 | 8/2013 | Cahen |
| 2013/0292316 | A1 | 11/2013 | Pohl |
| 2014/0054208 | A1 | 2/2014 | Vestergaard Frandsen et al. |
| 2014/0086565 | A1 * | 3/2014 | Lilley ............... B67D 1/07 392/449 |
| 2015/0068987 | A1 | 3/2015 | Bassett et al. |
| 2015/0198199 | A1 | 7/2015 | Wu |
| 2015/0342117 | A1 | 12/2015 | Aliss |
| 2015/0366627 | A1 | 12/2015 | Oginski et al. |
| 2016/0207730 | A1 | 7/2016 | Mueller |
| 2016/0338264 | A9 | 11/2016 | Alliss |
| 2017/0050836 | A1 | 2/2017 | Yoon |
| 2017/0079467 | A1 | 3/2017 | Bouziad et al. |
| 2017/0153056 | A1 | 6/2017 | Kim et al. |
| 2017/0291807 | A1 | 10/2017 | Jeon |
| 2017/0319990 | A1 | 11/2017 | Jeon et al. |
| 2017/0320721 | A1 | 11/2017 | Choi et al. |
| 2017/0321927 | A1 | 11/2017 | Jeon et al. |
| 2018/0002153 | A1 | 1/2018 | Kim et al. |

FOREIGN PATENT DOCUMENTS

| | | |
|---|---|---|
| CN | 201001640 | 1/2008 |
| CN | 201303862 Y | 9/2009 |
| CN | 103200850 A | 7/2013 |
| CN | 103608297 A | 2/2014 |
| CN | 104245602 | 12/2014 |
| CN | 204062015 | 12/2014 |
| CN | 204133196 | 2/2015 |
| CN | 204133225 | 2/2015 |
| CN | 104414226 A | 3/2015 |
| CN | 204292939 | 4/2015 |
| CN | 204394244 U | 6/2015 |
| EP | 1 136 447 | 9/2001 |
| EP | 2 080 459 | 7/2009 |
| JP | 2006-021186 | 1/2006 |
| KR | 10-2005-0112743 | 12/2005 |
| KR | 10-2007-0115097 | 12/2007 |
| KR | 10-2011-0047370 A | 5/2011 |
| KR | 10-2014-0034519 | 3/2014 |
| KR | 10-1381803 | 4/2014 |
| KR | 10-2015-0004669 | 1/2015 |

OTHER PUBLICATIONS

Chinese Office Action dated Oct. 28, 2020 issued in Application 201910283881.5 and English translation.
European Search Report dated Feb. 26, 2019 issued in Application No. 16839435.1.
Korean Office Action dated Aug. 5, 2016 issued in Application No. 10-2015-0118211.
Korean Office Action dated May 18, 2017 issued in Application No. 10-2017-0034881.
Korean Office Action dated May 18, 2017 issued in Application No. 10-2017-0034882.
Korean Office Action dated May 18, 2017 issued in Application No. 10-2017-0034883.
International Search Report dated May 22, 2017 issued in Application No. PCT/KR2016/007142.
U.S. Office Action dated Jan. 3, 2018 issued in co-pending U.S. Appl. No. 15/200,214.
U.S. Notice of Allowance dated May 22, 2018 issued in co-pending U.S. Appl. No. 15/200,214.
European Search Report dated Jul. 23, 2020 issued in Application No. 20150169.9.
Chinese Office Action dated Aug. 21, 2018 issued in Application No. 201610685295.X (English translation attached).
Chinese Notice of Allowance (with English translation) dated May 17, 2021 issued in CN Application No. 201811531602.4.
Chinese Office Action (with English translation) dated Jun. 18, 2021 issued in CN Application No. 201910283881.5.

* cited by examiner

LIQUID DISPENSER

CROSS-REFERENCE TO RELATED APPLICATION

This application is a Divisional Application of prior U.S. patent application Ser. No. 15/200,214 filed Jul. 1, 2016, which claims priority under 35 U.S.C. § 119 to Korean Application No. 10-2015-0118211, filed on Aug. 21, 2015, whose entire disclosure is incorporated herein by reference.

BACKGROUND

1. Field

Embodiments relate to a water dispenser.

2. Background

A water dispenser is a device that provides drinking water to users. Water dispensers may dispense purified water by removing materials included in raw water, such as, e.g., tap water or underground water, through various water purification methods such as precipitation or settlement, filtering, and sterilization. A water discharger may be provided in a main body of a water dispenser to provide purified water to a user.

FIG. 1 is a perspective view of a related art water dispenser. Referring to FIG. 1, a coupling hole 11 may be formed on an upper end portion of a main body 10, and a water discharger 20 may be coupled to the upper end portion of a main body 10 through the coupling hole 11. A plurality of recess portions 11a may be spaced apart from one another at an angle of 90° in a circumferential direction of the coupling hole 11. The water discharger 20 may have a plurality of positioners 25a that protrude and may be spaced apart from one another in a circumferential direction of an outer circumferential surface of a coupling column 25. As the positioners 25a are coupled to the recess portions 11a, the water discharger 20 may be rotated in a clockwise direction or counterclockwise direction at a set angle so as to be fixed.

A plurality of coupling housings 13 may be spaced apart from one another at an angle of 90° such that a water trap 30 may be coupled to a lower portion of the main body 10. The water trap 30 may have a protrusion 31 that protrudes from a back of a water trap housing. When the protrusion 31 is inserted into an interior of the coupling housing 13 and rotated in a clockwise direction or counterclockwise direction, the water trap 30 may be fixed.

The water discharger 20 and the water trap 30 may be detachably coupled to upper and lower portions of the main body 10, respectively. The user may change a position from which water is discharged as desired, and the water dispenser may be installed without spatial restrictions. Such a water dispenser may have a few problems.

In order to change a direction of the water discharger 21 or the water trap 30, for example, from a forward/backward direction of the main body 10 to a horizontal direction, the water discharger 20 or the water trap 30 may need to be separated from the main body 10 and subsequently reassembled, which may be inconvenient. Unless the recess portion 11a formed on an upper portion of the main body 10 and the positioner 25a of the water discharger 20 are separated from each other, the water discharger 20 may not be freely rotated. When the water discharger 20 is rotated, the user may feel that the positioner 25a may be caught by or on the recess portion 11a.

The water discharger 20 may include a first water discharge pipe 22 connected to a water discharge port 21 and horizontally provided, a second water discharge pipe 24 connected to a water purification filter installed within the main body 10 and vertically provided, and a pipe fitting 23 that connects the first and second water discharge pipes 22 and 24. An O-ring may be provided within the pipe fitting 23 to maintain airtightness between the pipe fitting 23 and the water discharge pipes 22 and 24. The first and second water discharge pipes 22 and 24 may be formed of the same type of material, for example, an ABS resin material.

When the water discharger 20 is rotated and the water discharge pipes 22 and 24 formed of the same material are connected to each other, the first water discharge pipe 22 and the pipe fitting 23 may be rotated together with the second water discharge pipe 24 fixed, and the O-ring installed in the pipe fitting 23 may make a frictional contact with the fixed second water discharge pipe 24 as it is rotated. This may abrade the O-ring and cause water leakage between the second water discharge pipe 24 and the pipe fitting 23.

Korean Patent Registration No. 1381803, registered on Mar. 31, 2014, provides a water purifier, and is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
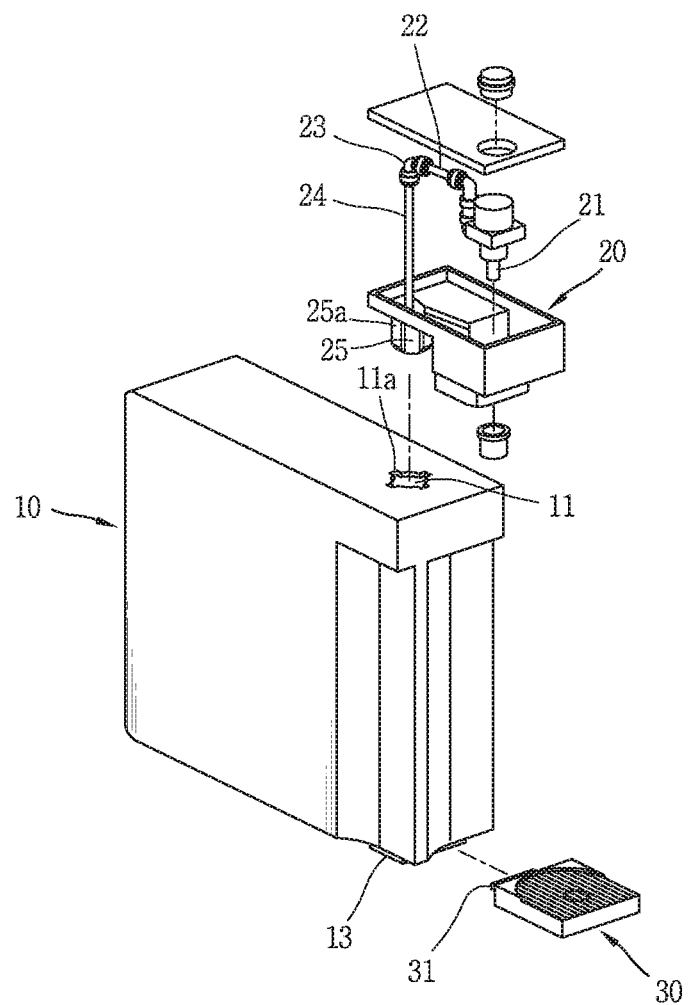
FIG. 1 is a perspective view of a related art water dispenser.
Figure 2:
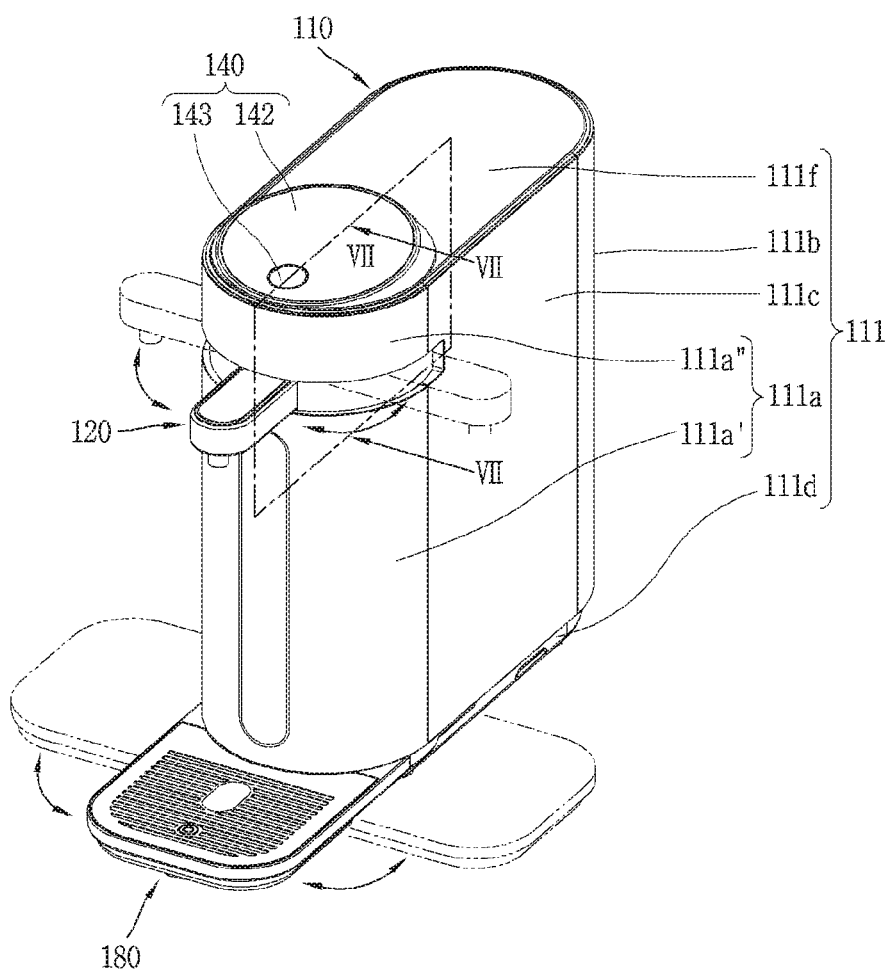
FIG. 2 is a perspective view of a water dispenser according to an embodiment.
Figure 3:
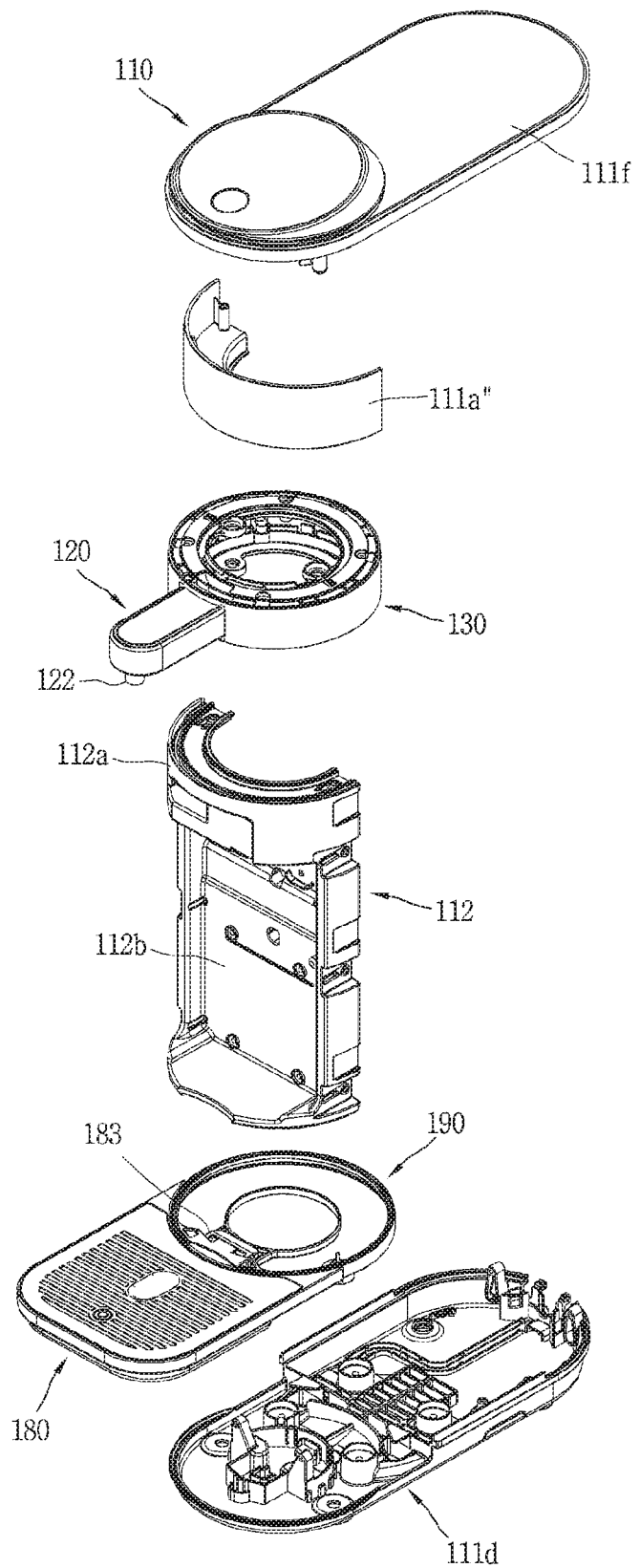
FIG. 3 is an exploded view of the water dispenser of FIG. 2.

Referring to FIG. 2 and FIG. 3, a water dispenser according to an embodiment may include a water discharger 120 that may be easily rotated. The water dispenser may further include an operation module 140, which may rotate simultaneously with the water discharger 120 when the water discharger 120 is rotated. The water dispenser may also include a residual water tray 180, which may rotate separately when the water discharger 120 is rotated.

The water dispenser may include a main body 110, the water discharger 120, the operation module 140, and the residual water tray 180. The main body 110 may include a cabinet 111 that forms an appearance of the water dispenser. The cabinet 111 may include a front cover 111a and a rear cover 111b that forms a front surface and a rear surface of the water dispenser, respectively, and side panels 111c that form side surfaces of the water dispenser to connect the front cover 111a and the rear cover 111b. The cabinet 111 may have a top cover 111f that forms an upper surface of the water dispenser and a base panel 111d that forms a lower surface of the water dispenser.

The front cover 111a may include a first front cover 111a' that forms a large portion of the front surface of the water dispenser and a second front cover 111a" spaced apart from the first front cover 111a' in an upward direction. The front cover 111a may be convex and may have a curvature with a semi-circular shape. In the front cover 111a, an opening may be formed between the first cover 111a' and the second front cover 111a", and the water discharger 120 may protrude through the opening and rotate in a horizontal direction. A mounting portion may be provided on an inner side of the second front cover 111a" to allow a front end portion of the top cover 111f to be mounted thereon. The cabinet 111 may extend in a longitudinal direction and may be relatively short in width in a traverse direction when viewed from above in FIG. 2.

The water discharger 120 may protrude from one side of a rotator 130 and may rotate together with the rotator 130. The water discharger 120 may have a water discharge port 122 to dispense purified water to a user. The water discharge port 122 may be provided on or at a lower surface of an end portion of the water discharger 120. The rotator 130 may be rotatably installed within the main body 110.

A support 112 to support the rotator 130 may be provided within the main body 110, and the support 112 may be perpendicular to the upper surface of the base panel 111d. An upper support portion 112a may be formed to be concave with curvature having a semi-circular shape and may be provided in an upper end portion of the support 112.

A filter installation portion 112b, in which a plurality of filters may be detachably installed, may be provided on a front surface of the support 112. The upper support portion 112a and the filter installation portion 112b may form an upper portion and a lower portion of the support 112 so as to form a single support body. The filter installation portion 112b may be depressed and may be more concave than the upper support portion 112a. The filter installation portion 112b may have a planar shape and may have a filter support portion protruding from a lower end thereof to support a lower portion of a filter. A plurality of filters may be inserted into a depressed space below the upper support portion 112a and may be vertically installed in the filter installation portion 112b. The plurality of filters may purify raw water by filtering out materials in the raw water. The rotator 130 may be installed to be rotatable in a horizontal direction on an upper end of the support 112.

The operation module 140 may be rotatably provided on a front side of the top cover 111f. The operation module 140 may have a coupling protrusion 144b positioned above the rotator 130 and coupled to the rotator 130, so that the operation module 140 and the rotator 130 may be rotated together. The operation module 140 may include a water discharge button 143 and a display panel 142.

The water discharge button 143 may be provided on one side of an upper surface of the operation module 140 and may allow a user to selectively press the water discharge button 143. The main body 110 may further include a controller, for example, a PCB, connected to the water discharge button 143 to receive a water discharge signal from the water discharge button 143 and a water discharge valve to open and close a water discharge pipe according to the water discharge signal. When the water discharge button 143 is pressed, the controller may transmit the water discharge signal to the water discharge valve, and the water discharge valve may receive a control signal from the controller to open the water discharge pipe so as to provide purified water to the user. An LED lamp may be provided below the water discharge button 143 to show the water discharge button 143 is in operation.

The display panel 143 may include an input that allows the user to select purified water, hot water, and cold water, and a display that displays a purified water, hot water, or cold water mode currently selected. The input may include, for example, a hot water selection button and a purified water/cold water selection button. The controller may be electrically connected to the input and the display. The controller may display information from the input on the display.

The residual water tray 180 may be provided in the base panel 111d to prevent a portion of water dispensed from the water discharge port 122 from flowing out of a cup and pooling at or on a bottom of the water dispenser. The residual water tray 180 may include a tray body 181 formed to be flat and concave in a downward direction to temporarily store water and an upper grill 182 detachably coupled to an upper portion of the tray body 181. Side surfaces of edge portions of the tray body 181 may be blocked in every direction to store a predetermined amount of water. The upper grill 182 may include a plurality of slits formed to be thin in a traverse direction to prevent water introduced to an interior of the tray body 181 from splashing to a periphery of the bottom of the water dispenser.

In order to allow the residual water tray 180 to be rotatably installed in a lateral direction from the base panel 111d, a rotary ring 190 to guide rotation of the residual water tray 180 may be rotatably installed on the base panel 111d. The rotary ring 190 may have an outer ring portion and an inner ring portion, and an installation portion 194 may be provided on one side of the outer ring portion. The residual water tray 180 may include a coupling portion 183 protruding from a rear side of the tray body 181, having a rectangular shape, and insertedly and detachably coupled to the installation portion 194. The residual water tray 180 may be connected to the rotary ring 190 through the coupling portion 183 and rotated in a horizontal direction with respect to the base panel 111*d*.

A cooling unit or device to cool water purified by a water purifying filter may be provided within the main body 110. The cooling unit may be provided as a refrigerating cycle device including a compressor, a condenser, an expansion valve, and an evaporator. A heater to heat purified water to produce hot water may be provided within the main body 110. The heater may be configured as an electric type heater or an induction heating type heater.

Figure 4:
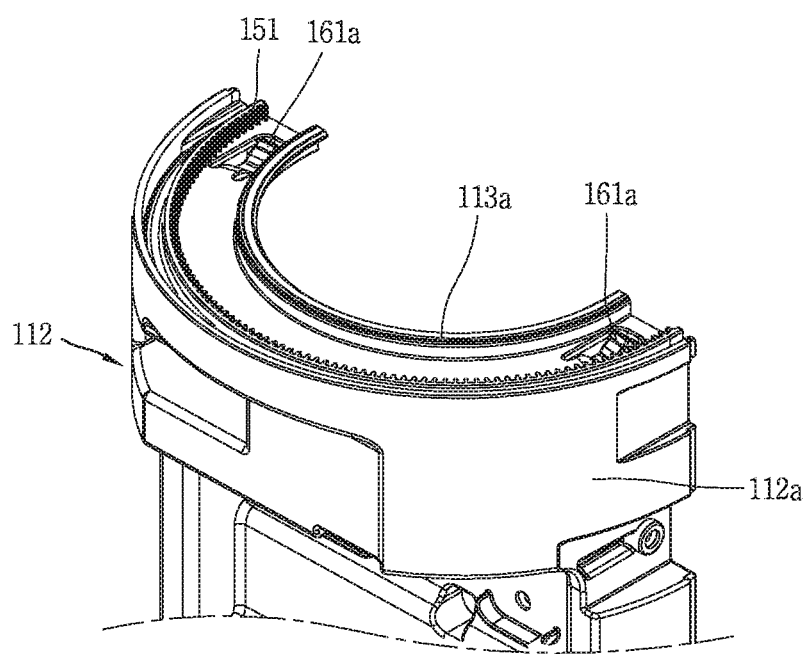
FIG. 4 is a perspective view of a portion of a rotation guide rail formed in an upper end portion of a support of FIG. 3.

Referring to FIG. 2 and FIG. 4, a rear side of the support 112 may be open towards a back direction, and a rear end portion of the support 112 may be coupled to a front end portion of the side panel 111*c*. A rotation guide rail 113 having a predetermined curvature may be provided within the main body 110 such that rotator 130 may be installed to be rotatable in a horizontal direction.

The rotation guide rail 113 may have a curvature of a semicircular shape to guide rotation of the rotator 130. The rotation guide rail 113 illustrated in FIG. 4 and FIG. 7 may include a first rotation guide rail 113*a* fixedly formed on an inner side of an upper end portion of the support 112 and a second rotation guide rail 113*b* that protrudes from an inner surface of the second front cover 111*a*" and is fixed. The first rotation guide rail 113*a* and the second rotation guide rail 113*b* may be spaced apart from one another in a vertical direction with the rotator 130 provided therebetween.

The rotator 130 may rotate the water discharger 120 horizontally in a left or right direction. The rotator 130 may not have a rotational axis at a central portion thereof. The rotator 130 may have a rotation guide protrusion 132 formed to have a predetermined curvature at the central portion. The rotation guide protrusion 132 may be slidably coupled to the rotation guide rail 113.

The rotation guide protrusion 132 may be provided in the rotator 130, and the rotation guide rail 113 may be provided in the main body 110. However, the rotation guide protrusion 132 and the rotation guide rail 113 may have a same curvature and may be coupled so as to engage with each other to guide rotation of the rotator 130. The rotator 130 illustrated in FIG. 5 and FIG. 6 may have a rotator housing 130*a*. The rotator housing 130*a* may have a cylindrical shape with a hollow portion therein and may be shorter in height than in diameter.

The water discharger 120 may have a water discharger housing 121 that protrudes from one side of the rotator 130, and a water discharge port 122 that protrudes from one side of the rotator 130. The water discharge port 122 may be formed on a lower surface of an end portion of the water discharger housing 121.

The rotator 130 may have an upper guide bracket 133 and a lower guide bracket 131 spaced apart from one another in an inner upper portion and in an inner lower portion, respectively, of the rotator housing 130*a*. A fastening portion 134 may protrude from an inner surface of the rotator housing 130*a* illustrated in FIG. 7, and fastening holes 135 may be spaced apart from one another in a circumferential direction on the upper guide bracket 133 and the lower guide bracket 131. A bolt, for example, may be inserted into an interior of the fastening portion 134 through the fastening hole 135 so as to be fastened such that the upper and lower guide bracket 133 and 131 may be spaced apart from each other within the rotator housing 130*a*.

The rotator 130 may further include a rail accommodation recess formed to be concave in a circumferential direction on the upper guide bracket 133 or the lower guide bracket 131. The rail accommodation recess may include a lower rail accommodation recess 131*a* for the first rotation guide rail 113*a* and an upper rail accommodation recess 133*a* accommodating the second rotation guide rail 113*b*. The rotation guide protrusion 132 may protrude in an upward direction or downward direction from one side of the upper rail accommodation recess 133*a* or the lower rail accommodation recess 131*a*, or may protrude in the upward direction and the downward direction from one side of the upper rail accommodation recess 133*a* and the lower rail accommodation recess 131*a*.

Figure 7:
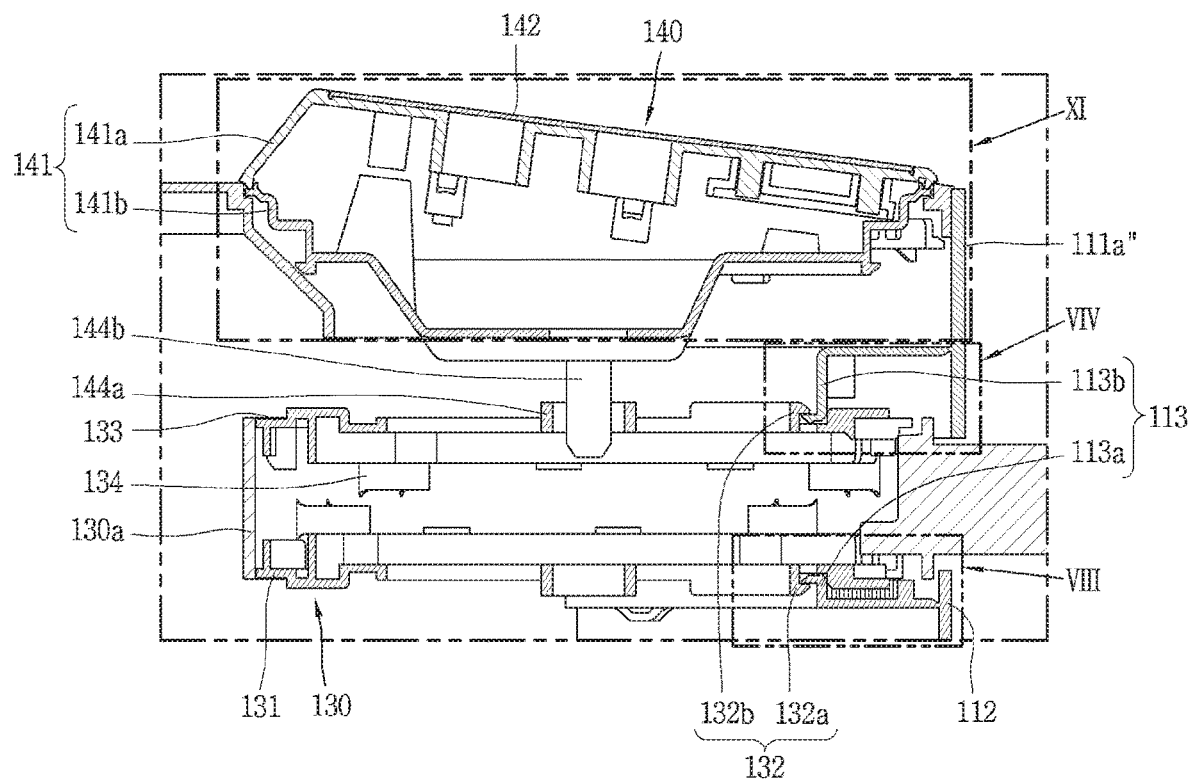
FIG. 7 is a cross-sectional view taken based upon VII-VII in FIG. 2.
Figure 8:
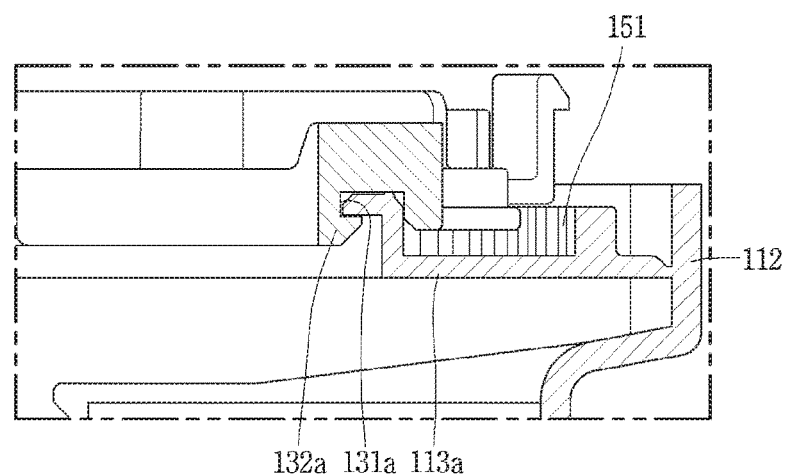
FIG. 8 is an enlarged cross-sectional view in FIG. 7.
Figure 9:
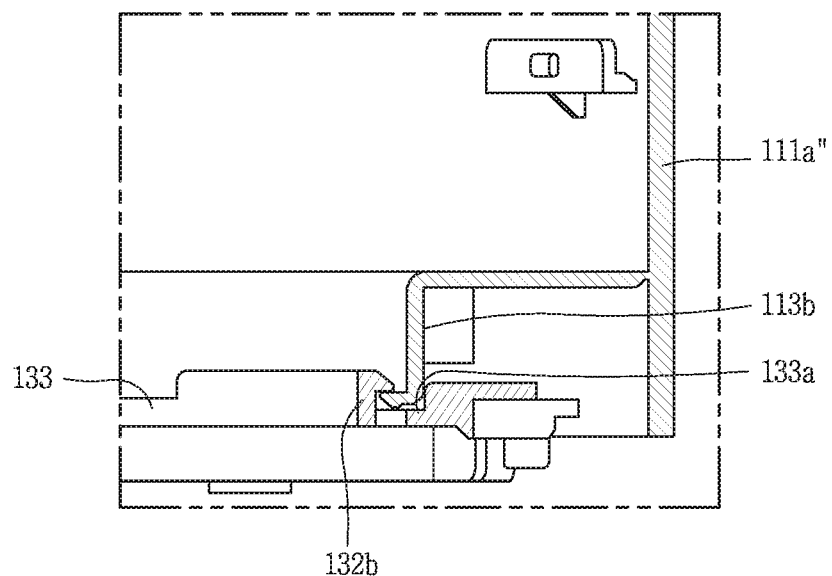
FIG. 9 is an enlarged cross-sectional view of a part of VIV in FIG. 7.
Figure 10:
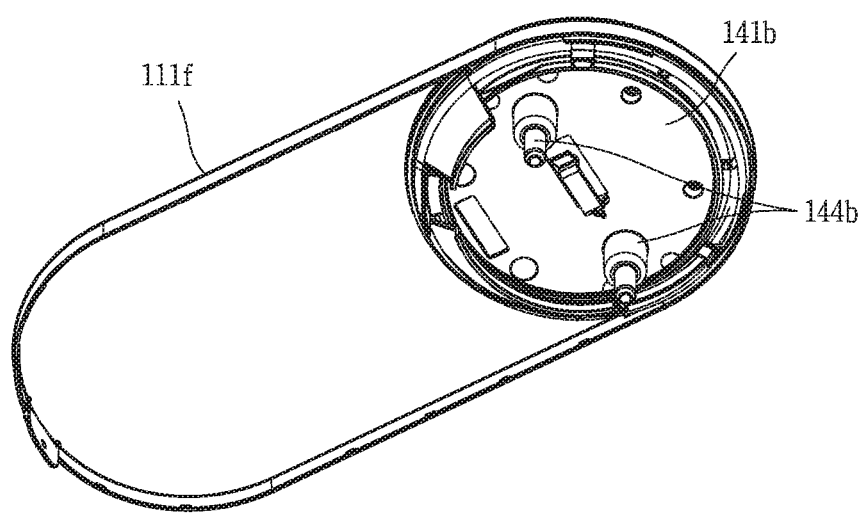
FIG. 10 is a perspective view of a lower surface of an operation module installed on a top cover according to an embodiment.
Figure 11:
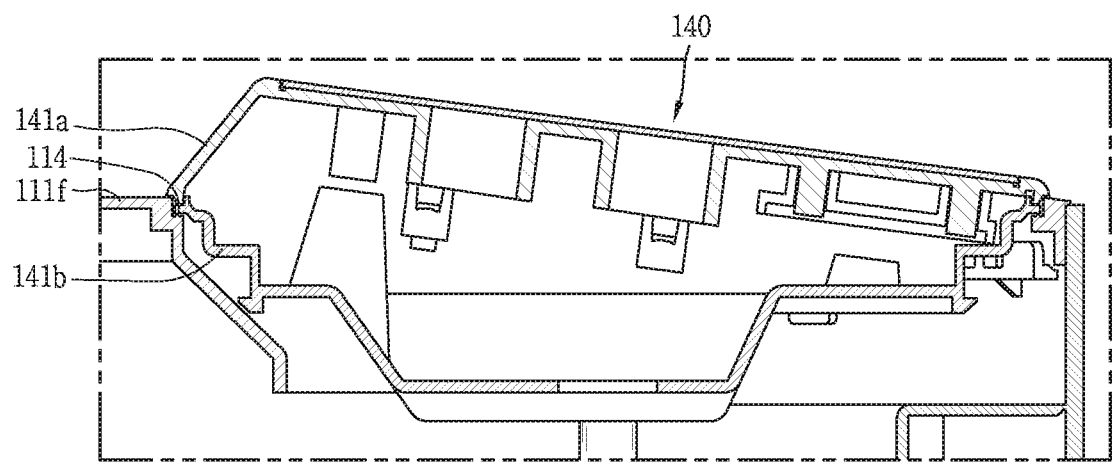
FIG. 11 is an enlarged cross-sectional view of a part of XI in FIG. 7.

For example, the rotation guide protrusion 132 illustrated in FIG. 7 to FIG. 9 may include the first rotation guide protrusion 132*a* that protrudes from the lower rail accommodation recess 131*a* of the lower guide bracket 131 in a downward direction and the second rotation guide protrusion 132*b* that protrudes in an upward direction from the upper rail accommodation recess 133*a* of the upper guide bracket 133. The rail accommodation recess may accommodate the rotation guide rail 113, and the rail accommodation recess may face one surface of the rotation guide rail 113 and overlap the rotation guide rail 113 in a thickness direction so as to be in contact therewith.

An end portion of the rotation guide protrusion 132 may have a hook shape. When the rotation guide protrusion 132 and the rotation guide rail 113 are coupled, an inner surface of the end portion of the rotation guide protrusion 132 may face a portion of the rotation guide rail 113 and overlap in a thickness direction so as to be in contact with each other. The rotation guide protrusion 132 illustrated in FIG. 5 and FIG. 6 may be in a partial section of the rail accommodation recess. For example, the water discharger 120 may protrude forwardly from one side of the rotator 130, and the water discharger 120 may rotate within an angle range from 60° to 90° in a horizontal direction in relation to a central line of the water discharger 120 in a length direction. However, the rotation guide protrusion 132 is not limited to the angle range.

Referring to FIG. 4 and FIG. 8, in order for the rotation guide protrusion 132 to be inserted in a rotation direction of the rotator 130 and assembled to any one of both end portions of the rotation guide rail 113, both end portions of the rotation guide protrusion 132 and the rotation guide rail 113 may be open. The rotation guide protrusion 132 may have a same curvature as that of the rotation guide rail 113, and may be coupled to the rotation guide rail 113 such that the rotation guide protrusion may be slidable in a rotation direction. When the rotation guide protrusion 132 and the rotation guide rail 113 are coupled, the rotation guide rail 113 may be accommodated in the rail accommodation recess formed on an inner side of the rotation guide protrusion 132 such that the rail accommodation recess and the rotation guide rail 113 overlap in a thickness direction. Since an end portion of the rotation guide protrusion 132 may be a hook shape, it may couple with the rotation guide rail 113 to overlap in a thickness direction.

According to this coupling structure, the water discharger 120 may be stably rotated, and the water discharge port 122 may freely change position. In this case, there may be no need to form a separate rotational axis at the center of the rotator 130. For example, if the water discharger 120 protrudes forwardly from one side of the rotator 130, even though the user grips the water discharger 120 and rotates the rotator 130, a problem in which the water discharger 120 is lifted or lowered due to an eccentric load of the water discharger 120 and destabilizes rotation of the water discharger 120 and the rotator 130 may be solved. Due to the hook shape of the rotation guide protrusion 132, the rotator 130 may be prevented from being released from the main body 110. When the rotator 130 is rotated, a contact area between the rotation guide protrusion 132 and the rotation guide rail 113 may be large. Thus, when the user takes and rotates the water discharger 120, an eccentric load may be distributed and damage, such as, e.g., wearing or scratch, due to frictional contact between the rotator 130 and the main body 110 may be reduced.

The upper guide bracket 133 and the lower guide bracket 131 may be formed of a same material and have a same size and shape. If the upper and lower guide brackets 133 and 131 are formed to have different shapes, molds to form the components may need to be additionally provided and the upper and lower guide brackets 133 and 131 may need to be separately managed, incurring costs for the molds and costs to manage the components. Thus, in order to reduce costs, the guide brackets installed in the upper and lower portions of the rotator housing 130a may be formed of the same material and have the same size and shape.

The upper guide bracket 133 and the lower guide bracket 131 may be formed of a material different from those of the rotator housing 130a, the support 112 of the main body 110, and the front cover 111a. For example, the first and second rotation guide protrusions 132b respectively formed in the upper guide bracket 133 and the lower guide bracket 131 may be formed of a material different from that of the rotation guide rail 113 provided within the main body 110. The rotation guide protrusion 132 may be formed of polyoxymethylene (POM). Polyoxymethylene (POM) may also be called polyacetal or acetal resin. POM is an engineering plastic having excellent fatigue resistance, tenacity or toughness, and wear resistance.

The first rotation guide rail 113a of the upper side of the support 112 and the second rotation guide rail 113b of the second front cover 111a" may be formed of acrylonitrile butadiene styrene (ABS), a general plastic material. Accordingly, when the rotation guide protrusion 132 rotates along the rotation guide rail 113, wearing and noise due to frictional contact between the rotation guide protrusion 132 and the rotation guide rail 113 may be reduced.

The rotator 130 may include an upper central ring 136b and a lower central ring 136a respectively provided at the central portions of the upper guide bracket 133 and the lower guide bracket 131. An upper connection portion 137b and a lower connection portion 137a may extend horizontally and respectively from inner side surfaces of the upper guide bracket 133 and the lower guide bracket 131 to the upper central ring 136b and the lower central ring 136a, so that the upper central ring 136bn and the lower central ring 136a may be connected to and supported by the upper guide bracket 133 and the lower guide bracket 131 by the upper connection portion 137b and the lower connection portion 137a. The upper and lower connection portions 137b and 137a may have a fan shape and include a plurality of through holes therein.

The upper central ring 136b and the lower central ring 136a show where to install and guide the water discharge pipe. The water discharge pipe may include a first water discharge pipe 170 connected to at least one of a purified water flow channel, a cold water flow channel, and a hot water flow channel, a second water discharge pipe 172 provided in a direction crossing the first water discharge pipe 170 and connected to the water discharge port 122, and a pipe fitting 171 that connects the first water discharge pipe 170 and the second water discharge pipe 172. For example, purified water, cold water, or hot water may flow to the water discharge port 122 along the first and second water discharge pipes 170 and 172 so as to be provided to the user. The first water discharge pipe 170 may be provided through the lower central ring 136a, and an upper end portion of the first water discharge pipe 170, the pipe fitting 171, and the second water discharge pipe 172 may be assembled to extend to the water discharge port 122 by way of a central portion of the rotator housing 130a and the interior of the housing of the water discharge port 122.

The operation module 140 may be rotatably installed in an upper end portion of the main body 110. The operation module 140 may be able to simultaneously rotate with the rotator 130. Referring to FIG. 2, FIG. 7, FIG. 10, and FIG. 11, the operation module 140 may include an operation module housing 141, a display panel or display 142, and a water discharge button 143. The operation module housing 141 may include an upper housing 141a and a lower housing 141b. An accommodation space may be provided between the upper housing 141a and the lower housing 141b. An electronic component, such as, e.g., a printed circuit board (PCB), may be accommodated in the accommodation space. A display 142 may be installed on the upper housing 141a, and a PCB, which may be a component of a controller, may be provided to be adjacent below the display 142. The PCB may operate in connection with an operation of an input button of the display 142, and thus, the controller may receive a signal from the input button.

The lower housing 141b may be fastened to the upper housing 141a through a separate fastener. A circular through hole for installation of the operation module 140 may be formed on the top cover 111f of the main body 110, and a rotation guide recess 114 may be provided on an edge portion of the through hole of the top cover 111f in a circumferential direction to allow the operation module 140 to be rotatably installed in the rotation guide recess 114. The upper housing 141a or the lower housing 141b may have a release preventing protrusion to prevent the operation module 140 from being released from the top cover 111f in an upward direction. The release preventing protrusion may extend in a downward direction from the upper housing 141a or the lower housing 141b, and an end portion of the release preventing protrusion may have a hook shape and may be provided to overlap a portion of the top cover 111f in a vertical direction.

Figure 5:
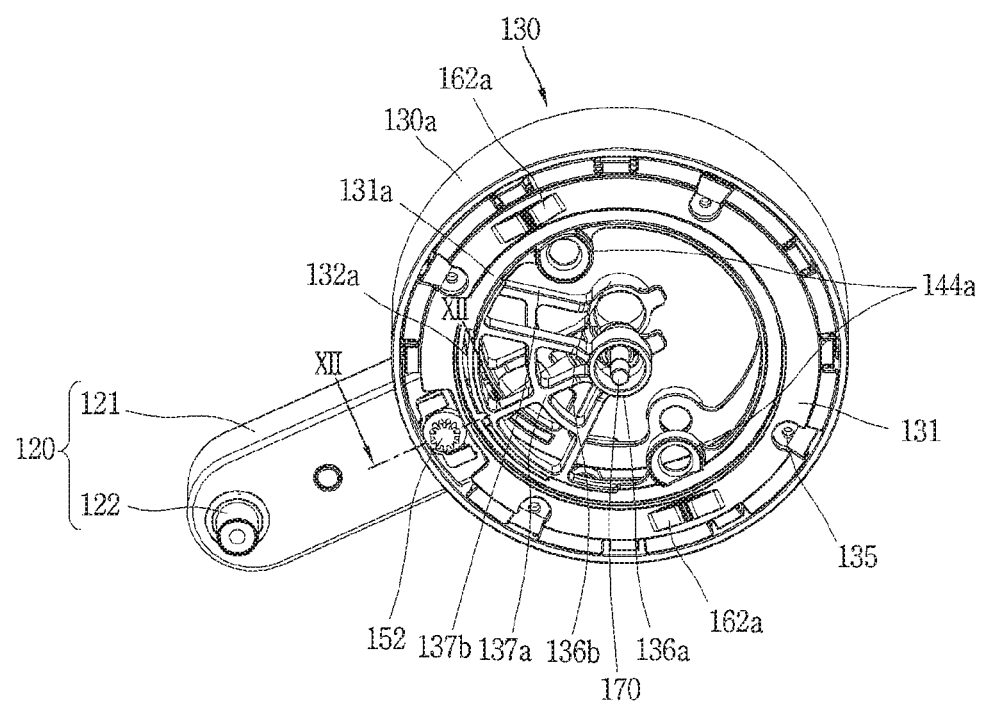
FIG. 5 is a perspective view of a lower surface of a rotator of FIG. 3.
Figure 6:
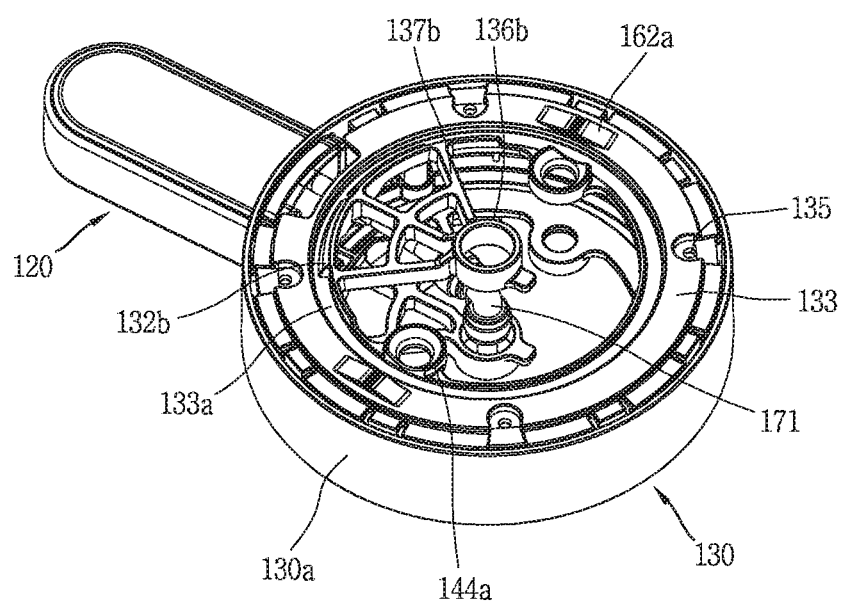
FIG. 6 is a perspective view of an upper surface of a rotator of FIG. 3.

A connector 144 may be provided in each of the operation module 140 and a rotator 130 to connect the operation module 140 and the rotator 130 such that the operation module 140 and the rotator 130 may be rotated together. The connector 144 may include a coupling ring 144a and a coupling protrusion 144b. As illustrated in FIG. 5 to FIG. 7, the coupling protrusion 144b may be formed on a lower surface of the lower housing 141b of the operation module 140, and the coupling ring 144a may be formed in the upper guide bracket 133 of the rotator 130. The coupling ring 144a may have a circular coupling hole therein. The coupling ring 144a may be provided in plurality. The plurality of coupling rings 144a may be spaced apart from one another in a radial direction from a virtual rotational axis of the rotator 130. The plurality of coupling rings 144a may be symmetrical in relation to a central line that traverses the rotational axis in a diameter direction. The plurality of coupling rings 144a may be formed on both the upper guide bracket 133 or the lower guide bracket 131, or may be formed only on the upper guide bracket 133. The plurality of coupling rings 144a may be connected to the upper and lower guide brackets 133 and 131 by a ring joint portion.

According to another embodiment of the connector 144, the coupling protrusion may formed to protrude in an upward direction from the upper guide bracket 133 of the rotator 130, and the coupling hole may be formed on a lower surface of the operation module 140. Accordingly, as the coupling protrusion is insertedly coupled into the coupling hole, the operation module 140 may also be rotated when the rotator 130 rotates.

According to the operation module 140 and the connector 144 of the rotator 130, when the operation module 140 and the rotator 130 rotate together, the water discharge button 143 and the water discharger 120 also rotates together. The water discharge button 143 and the water discharge port 122 may be aligned and rotated, and there may be no need to separately adjust a position of the water discharge button 143 and the water discharge port 122 so as to improve user operability.

If the water discharger 120 protrudes forwardly from the main body 110 of the water dispenser so as to be fixed as in the related art, there may be spatial restrictions with respect to other kitchen utensils when the water dispenser is installed. However, since the water discharger 120 according to an embodiment may be freely rotated in a horizontal direction by the user, there may be less spatial restrictions when the product is installed. Since changes in position of the water discharger 120 may be in a convenient manner and direction, space utilization may be enhanced.

The water dispenser according to an embodiment may include an oil damper 150 that allows the water discharger 120 to be rotated smoothly at a uniform speed when a predetermined magnitude of force is applied thereto, such that user may feel that the water discharger 120 is moving smoothly and is not stuck. An internal gear 151 and a pinion gear 152 may be provided within the main body 110. Thus, when the water discharger 120 is manually rotated, rotational force applied to the water discharger 120 may be transmitted to the oil damper 150.

Referring to FIG. 4, the internal gear 151 may be formed to have a predetermined curvature at an upper end of the support 112. The internal gear 151 may be spaced apart from the first rotation guide rail 113a in a radial direction. The internal gear 151 may be adjacent to an outer edge portion of an upper end portion of the support 112, and may be provided concentrically with the first rotation guide rail 113a. Sawteeth may be formed to protrude at or on an inner circumferential surface of the internal gear 151, and a protruding direction of the sawteeth and an opening direction of recesses formed between the sawteeth may be oriented toward the first rotation guide rail 113a.

Figure 12:
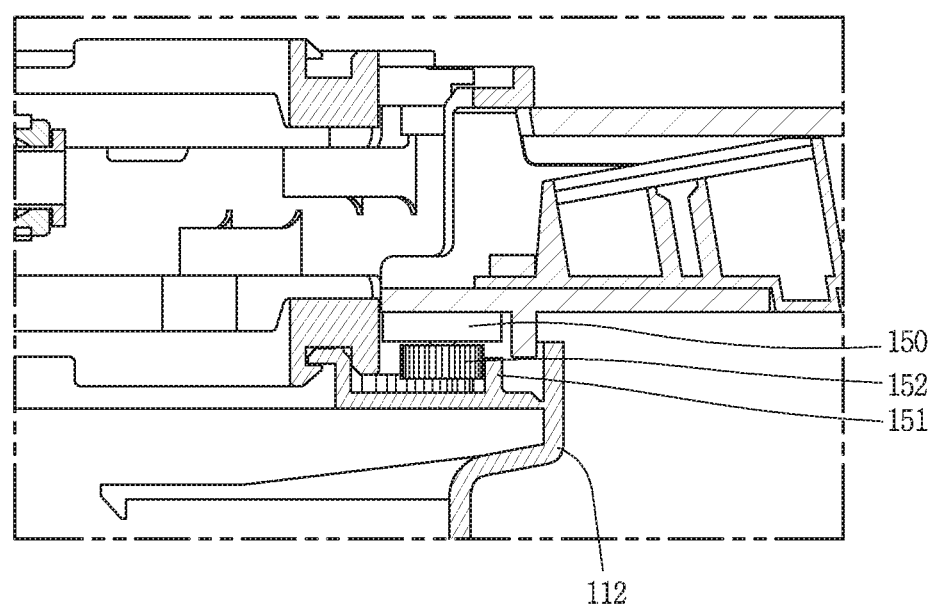
FIG. 12 is a cross-sectional view taken based upon XII-XII in FIG. 5.

Referring to FIG. 5 and FIG. 12, the pinion gear 152 may be provided on a lower surface of the rotator 130, may have a circular shape having a radius of curvature much smaller than that of the internal gear 151, and may have a smaller number of sawteeth than a number of sawteeth of the internal gear 151. When the rotator 130 is installed in an upper end portion of the support 112, the pinion gear 152 may be provided on an inner side of the internal gear 151 to engage with the internal gear 151.

Figure 13:
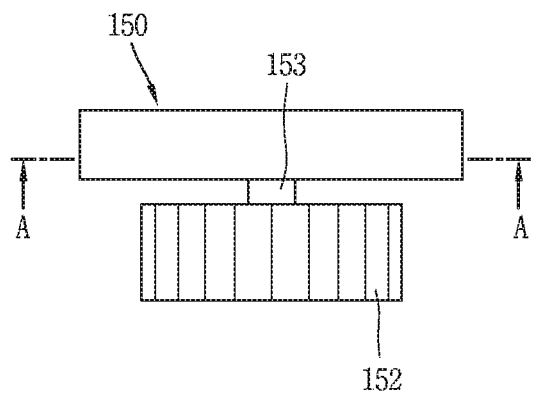
FIG. 13 is an enlarged view of the oil damper and the pinion gear of FIG. 12.
Figure 14:
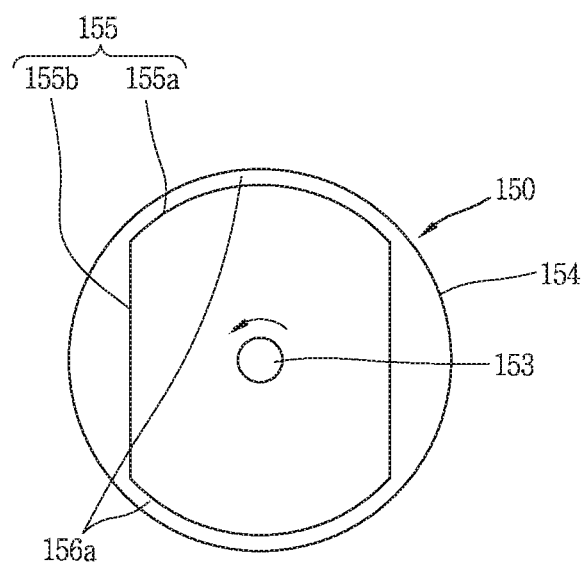
FIG. 14 is a cross-sectional view taken along line A-A of FIG. 13 of an oil damper according to an embodiment.

The oil damper 150 as shown in FIG. 13 and FIG. 14 may include a damper housing 154 and a rotor 155 rotatably installed within the damper housing 154. The damper housing 154 may have an accommodation space therein to store oil or accommodate the rotor 155. The damper housing 154 may have a circular shape. The damper housing 154 may be provided to overlap the pinion gear 152 in a thickness or height direction. The rotor 155 may have a predetermined thickness and an oval plate shape. For example, an outer edge portion of the rotor 155 may have a pair of curved portions 155a having a predetermined curvature and a linear portion 155b having a linear shape and that connect the curved portions 155a.

A rotational axis 153 may vertically penetrate through a central portion of the damper housing 154 and may be rotatably coupled thereto. One side of the rotational axis 153 may be inserted into the damper housing 154 and coupled to the rotor 155, and another side of the rotor 155 may protrude from the damper housing 154 and may be coupled to the pinion gear 152. Accordingly, when the pinion gear 152 rotates, the rotor 155 may also be rotated.

The curved portion 155a may be spaced apart from an inner surface of the damper housing 154 with a predetermined gap 156a provided therebetween. The linear portion 155b may be spaced apart from the inner surface of the damper housing 154, and a space between the linear portion 155b and the damper housing 154 may be increased toward a central portion of the rotor 155. The space between the linear portion 155b and the damper housing 154 may be greater than the space between the curved portion 155a and the damper housing 154.

According to a connection of the oil damper 150 and the pinion gear 152, when the rotor 155 rotates oil, a great amount of oil stored between the linear portion 155b and the damper housing 154 may be rotated upon receiving rotational force from the linear portion 155b, and another remaining amount of oil may be leaked out through the gap 156a between the curved portion 155a and the damper housing 154 to dampen rotational force of the rotor 155 and absorb kinetic energy of the rotator 130. Oil leaking out through the narrow gap 156a may frictionally contact the rotor 155 and discharge a portion of kinetic energy of the rotor 155 absorbed by viscosity of the oil itself as frictional heat. As the gap 156a is smaller and the viscosity of oil is greater in an embodiment as compared to in the related art, damping force of the oil damper 150 may be increased.

Without the operation of the oil damper 150, a rotation speed of the water discharger 120 may be low or the water discharger 120 may rotate excessively at a high speed according to a magnitude of force applied by the user to the water discharger 120. The water discharger 120 may rotate so fast to be damaged. However, according to the oil damper 150, the water discharger 120 may be smoothly rotated at a predetermined speed, regardless of magnitude of force applied by the user. If the water discharger 120 is rotated by a force smaller than the damping force of the oil damper 150 set based on viscosity of oil, the water discharger 120 may not be rotated. The water discharger 120 may be rotated only when a force having a predetermined magnitude or greater is applied thereto.

Figure 15:
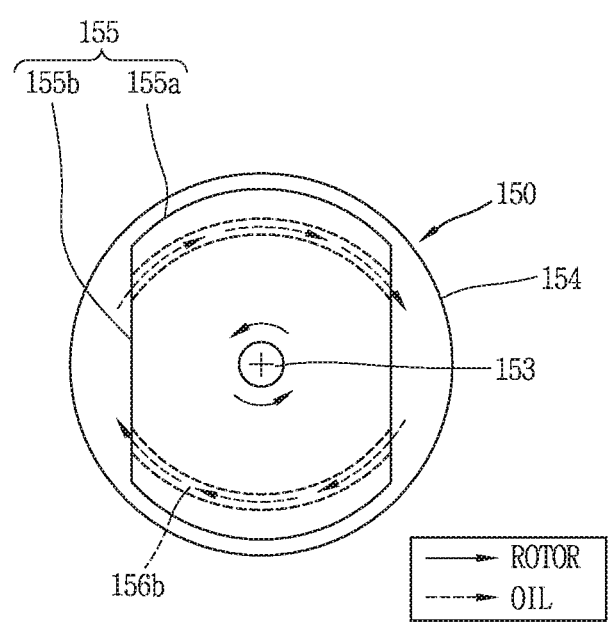
FIG. 15 is a view of another oil damper according to an embodiment.
Figure 16:
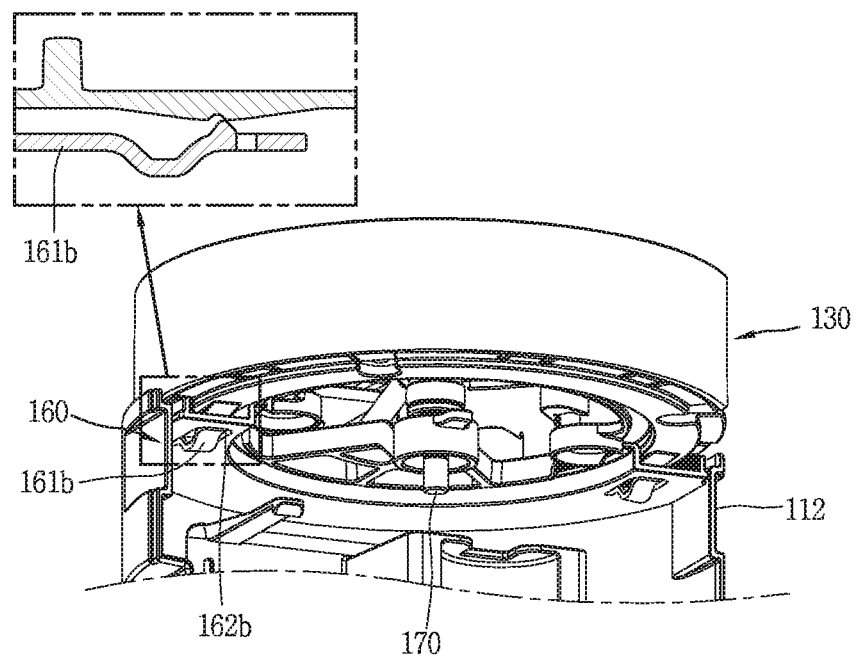
FIG. 16 illustrates an embodiment of a positioning device which is different from the positioning device in FIG. 4 and FIG. 5.

Referring to FIG. 15, the oil damper 150 according to another embodiment may further include a plurality of oil movement holes or oil passages 156b within the rotor 155. As shown, the oil passages 156b may be formed to have a predetermined curvature within the rotor 155. The oil passages 156b may be symmetrical to each other in relation to a central line traversing the rotational axis 153 of the rotor 155. The oil passages 156b may also have a linear shape, without being limited to a circular arc shape, and a cross-section of the oil passages 156b may have various shapes, such as, e.g., a circular shape or a polygonal shape.

The water dispenser according to an embodiment may include a positioning device 160 to keep the water discharger 120 at a specific position. For example, the water discharger 120 may be kept at a position at a center of the front cover 111a. However, a specific position of the water discharger 120 is not limited to the dead center of the front cover 111a and may be provided and kept at various positions such as 30°, 45°, or 60° in a horizontal direction from the center of the front cover 111a. The positioning device 160 may include a stop protrusion 161a and an positioner 162a. When the stop protrusion 161a is inserted into the positioner 162b, rotation of the rotator 130 at an upper end of the support 112 may be limited. The positioner 162a may be formed in the support 112 or the rotator 130.

The stop protrusion 161a may be provided to face the positioner 162b and may be formed in the rotator 130 or the support 112. The stop protrusion 161a as shown in FIG. 4 may be formed at the upper end of the support 112. A plurality of stop protrusions 161b may be spaced apart from one another in a radial direction from the center of curvature of the first rotation guide rail 113a, and may be formed at rear end portions of an upper end portion of the support 112. The plurality of stop protrusions 161b may be formed at an interval of 180 degrees in a circumferential direction. The stop protrusion 161a may be provided between the first rotation guide rail 113a and the internal gear 151 at an upper end of the support 112 and may be elastically supported such that a front end portion of the stop protrusion 161a is fixed and a rear end portion thereof is vertically movable.

The positioner 162a as shown in FIG. 5 may be on a lower surface of the lower guide bracket 131 of the rotator 130. A plurality of positioners 162a may be provided and may be symmetrical on the lower surface of the lower guide bracket 131 in relation to a central axis of the rotator 130 and a central line traversing the center of the water discharge port 122. The positioners 162a may be provided at an interval of 180 degrees in a circumferential direction. The positioner 162a may have a recess or notch at a central portion thereof and may be formed to have a height increased in a direction toward the arrest recess. The recess may extend in a width direction from a central portion of the positioner 162b and accommodate an end portion of the stop protrusion 161a. The recess may be provided to face an end portion of the stop protrusion 161a according to a rotation angle of the rotator 130. A shape and the number of each of the stop protrusions 161b and the positioners 162a are not limited, and two or more stop protrusions and two or more positioners may be formed.

When the water discharger 120 is positioned at the center of the front cover 111a, a virtual horizontal line traversing the two positioners 162b and a virtual vertical line traversing the center of the width of the water discharger 120 and a rotational axis of the rotator 130 may vertically intersect with each other, and since the positioner 162b is caught by the stop protrusion 161a, a position of the water discharger 120 may be kept at the center of the front cover 111a. The positioners 162a and the stop protrusions 161a may be positioned in mutually opposite positions. For example, the positioners 162b may be formed at the support 112 and the stop protrusions 161b may be formed at the rotator 130.

The positioning device 160 according to another embodiment may include a stop protrusion 161b formed on the lower guide bracket 131 of the rotator 130 and a positioner 162b formed at an upper end of the support 112. The positioner 162b may be formed as a hole formed in a thickness direction of the lower guide bracket 131. The stop protrusion 161b may have a convex portion that protrudes from a central portion thereof and may be elastically supported to be movable in a vertical direction. When the rotator 130 is rotated at an upper end of the support 112, the stop protrusion 161b may be inserted into and caught by the positioner 162b to limit rotation of the rotator 130. When rotation of the rotator 130 is limited and when a force that overcomes a fastening force of the stop protrusion 161b and the positioner 162b is applied, the stop protrusion 161b and the positioner 162b may be released. Accordingly, the user may easily change a position of the water discharge port 122.

Figure 17:
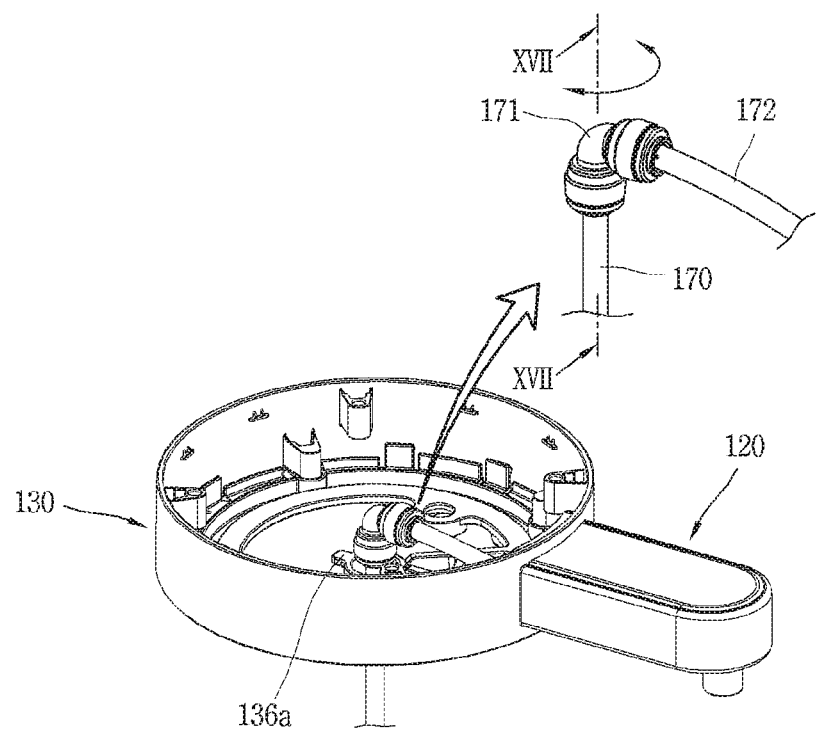
FIG. 17 is a view of a pipe fitting after an upper guide bracket is removed from the rotator in FIG. 6.
Figure 18:
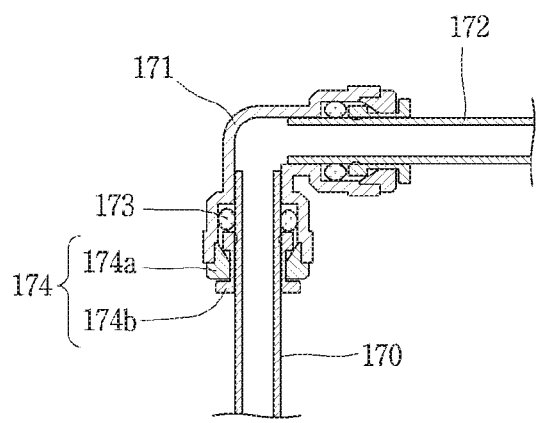
FIG. 18 is a cross-sectional view taken based upon XVII-XVII in FIG. 17.
Figure 19:
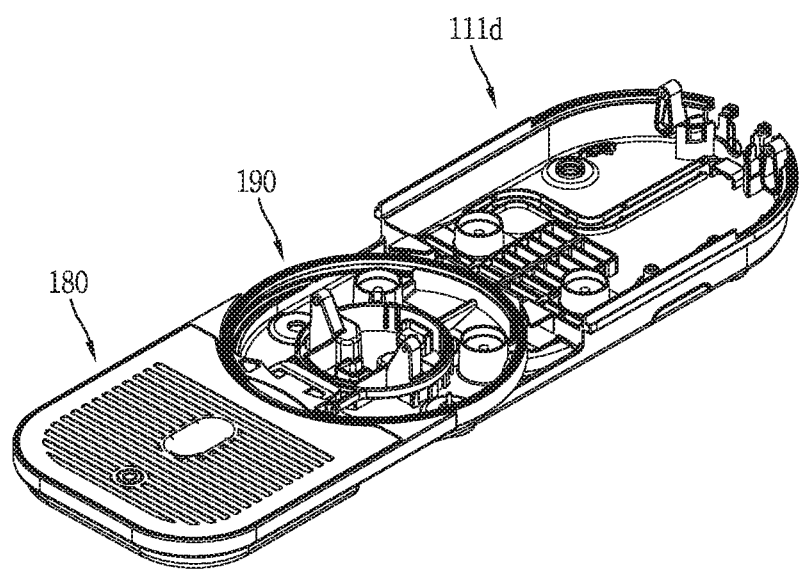
FIG. 19 is a perspective view in which a residual water tray may be installed in a base panel according to an embodiment.

Referring to FIG. 17, the rotator 130 may include a first water discharge pipe 170, a second water discharge pipe 172, and a pipe fitting 171 that provide a water discharge flow channel to discharge water. For example, the first water discharge pipe 170 may be fixedly provided and aligned with the rotational axis of the rotator 130 within the main body 110. The rotator 130 may not substantially provide the rotational axis, but the rotational axis of the rotator 130 may become a virtual axis with a rotation center when the water discharge part 120 rotates and may vertically penetrate a central portion of the rotator 130. In a direct type water dispenser, the first water discharge pipe 170 may be connected to a cold water flow channel or a hot water flow channel. In a water tank type water dispenser, the first water discharge pipe 170 may be connected to a cold water tank or a hot water tank.

The second water discharge pipe 172 may be provided in a direction crossing the first water discharge pipe 170, and one end portion of the second water discharge pipe 172 may be connected to the water discharge port 122. The pipe fitting 171 may be bent at a right angle and may connect an upper end portion of the first water discharge pipe and the other end portion of the second discharging pipe 172. Accordingly, the second water discharge pipe 172 and the pipe fitting 171 may be rotated together with the rotator 130.

An O-ring 173 may be provided within the pipe fitting 171. The O-ring 173 may maintain airtightness between the pipe fitting 171 and the water discharge pipe. The O-ring 173 may be inserted within an expanded portion having an increased diameter at end portions of the pipe fitting 171. A pair of pipe fasteners 134 may be provided within the expanded portion. The pipe fastener 134 may have a tubular shape with a hollow portion, and the water discharge pipe may be inserted into an interior of the pipe fastener 134 through the hollow portion. Among the pair of pipe fasteners 134, a first pipe fastener may have a sloped surface narrowing in a direction toward an inner side of one end portion and may have a flange portion with a shape bent at 90 degrees to outside of another end portion. The second pipe fastener 174b may have a hook portion formed at one end portion thereof and may have a flange portion formed at another end portion thereof. The first pipe fastener 174a may be fixed to the expanded portion, and the second pipe fastener 174b may be coupled so as to be movable in a length direction within the first pipe fastener 174a. Also, the hook portion of the second pipe fastener 174b may narrow or widen in a diameter direction while moving along the sloped surface of the first pipe fastener 174a.

For example, when the first water discharge pipe 170 is inserted into the second pipe fastener 174b, an end portion of the second pipe fastener 174b may be open in an outer diameter direction of the pipe and pressurized by water pressure of water flowing within the first water discharge pipe 170. In this state, if the first water discharge pipe 170 is pulled with respect to the pipe fitting 171 or if the pipe fitting 171 is pulled with respect to the first water discharge pipe 170, since the hook portion of the second pipe fastener 174*b* is inwardly moved along the sloped surface of the first pipe fastener 174*a* and narrowed to tighten the first water discharge pipe 170, the first water discharge pipe 170 may not be released from the pipe fitting 171. If the user presses the expanded portion inwardly, the second pipe fastener 174*b* may move in a direction toward the sloped surface having a greater diameter, and thus, the hook portion of the second pipe fastener 174*b* may be opened. Accordingly, the first water discharge pipe 170 may be released from the second pipe fastener 174*b*.

The pipe fitting 171 may be rotated together with the second water discharge pipe 172, the first water discharge pipe 170 may be fixed, and the O-ring 173 that covers the first water discharge pipe 170 may be rotated. In order to reduce wearing of the O-ring 173 due to mutual frictional contact between the first water discharge pipe 170 and the O-ring 173, the first water discharge pipe 170 may be formed of stainless steel having low surface roughness.

The related art first water discharge pipe 170 may be formed of a same ABS resin as that of the second water discharge pipe 172, causing the O-ring 173 to be worn. In contrast, the first water discharge pipe 170 according to an embodiment may be formed of stainless steel having low surface roughness, reducing wearing of the O-ring 173. Thus, water leakage due to wearing of the O-ring 173 may be reduced, and a length of time between replacing the O-ring 173 may be extended. Reliability of a product according to a change in rotation of the water discharge port 122 for a long period of time may be secured, and a problem of durability may be solved.

The water dispenser according to an embodiment may include a rotary device rotatably coupled to an interior of the main body 110 and the residual water tray 180 installed to be rotatable in a horizontal direction with respect to the main body 110. The residual water tray 180 may be provided below the water discharger 120 and may collect water dropped from the water discharger 120.

The rotary device may be provided as a rotary ring 190, and the residual water tray 180 may be provided on one side of the rotary ring 190 and installed to be rotatable with respect to the main body 110. The residual water tray 180 may be integrally formed with the rotary ring 190 or may be detachably coupled to one side of the rotary ring 190. The residual water tray 180 may include a tray body 181 having a storage space therein and an upper grill 182 detachably coupled to cover an upper portion of the tray body 181.

A storage space may be depressed in a downward direction within the tray body 181 to collect and store water therein. An edge portion of the tray body 181 may be configured to cover a side surface of the edge of the upper grill 182. A support portion to support a lower surface of the upper grill 182 may be provided within the tray body 181. A plurality of slits may be formed in the upper grill 182 so that water may enter the storage space of the tray body 181 through the slits and prevent water from splashing out from the interior of the tray body 181. A lower support portion may protrude from a lower surface of the tray body 181 and support the lower surface of the residual water tray 180 such that the residual water tray 180 may be supported with a predetermined height without sagging from an installation position of the water dispenser when the residual water tray 180 rotates in a horizontal direction.

A concave portion having a circular arc shape may be provided at a rear surface of the tray body 181, and a rear portion of the upper grill may cover a portion of the rotary ring 190. A protrusion portion may protrude in a backwards direction from an outer end portion of a rear surface of the tray body 181. An outer surface of the protrusion portion may extend from one side of the tray body 181 so as to be coplanar to cover a depressed portion of a connection portion between the residual water tray 180 and the rotary ring 190. An inner surface of the protrusion portion may be formed to have a same curvature as that of the curved surface of the concave portion so as to be in contact with an outer circumferential surface of the rotary ring 190. In order to couple the residual water tray 180 and the rotary ring 190, the coupling portion 183 may protrude backwards from the concave portion of the tray body 181.

The rotary ring 190 may be rotatably installed in a front portion of the base panel 111*d*, and the residual tray 180 may be detachably coupled to one side of a front portion of the rotary ring 190 and connected to the rotary ring 190 so as to be rotated in a horizontal direction with respect to the main body 110. A front portion of the base panel 111*d* may be a portion closest to the user when the user is in front of the water dispenser. A length of the front portion of the base panel 111*d* may be substantially a half of a length of the base panel 111*d* in a forward/backward direction or in a longitudinal direction along a longer side.

The front portion of the base panel 111*d* may have a step lower than a rear portion of the base panel 111*d* to form an opening between the front portion of the base panel 111*d* and a lower end portion of the second front cover 111*d*". The residual water tray 180 may be outwardly exposed from the main body 110 through the opening and rotated in a horizontal direction when coupled to the rotary ring 190. A step portion formed between the front portion and the rear portion of the base panel 111*d* may serve as a positioning device when the residual water tray 180 rotates. Side surfaces of the residual water tray 180 may be kept in place by the step portion and limit a rotation angle of the residual water tray 180.

A rotation guide protrusion portion 184 is provided within the base panel 111*d*. The rotation guide protrusion portion 184 may include a first rotation guide protrusion portion 184*a* and a second rotation guide protrusion portion 184*b* that may be concentric in the base panel 111*d*. The first rotation guide protrusion portion 184*a* may be provided outside of the second rotation guide protrusion portion 184*b*. The first rotation guide protrusion portion 184*a* and the second rotation guide protrusion portion 184*b* may protrude upwardly from a lower surface of the base panel 111*d* at a predetermined curvature to guide rotation of the rotary ring 190.

Figure 21:
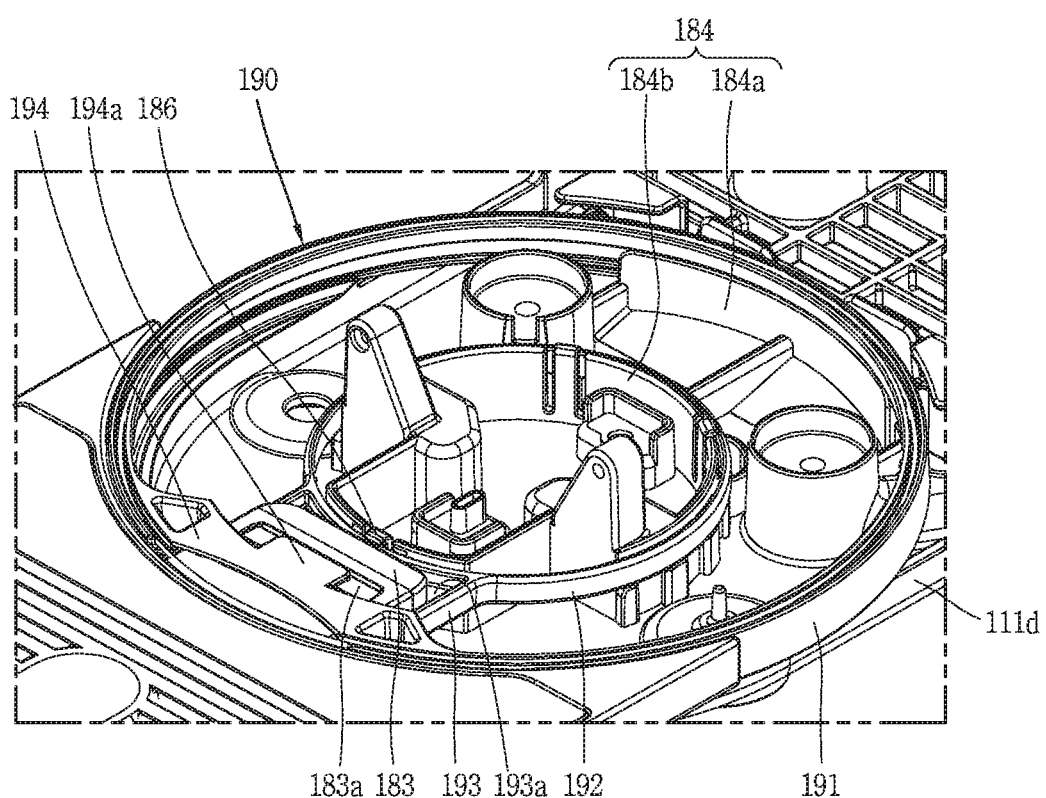
FIG. 21 is an enlarged perspective view of a rotary ring of FIG. 19.

The rotation guide protrusion portion 184 may be formed to have a circular shape or a circular arc shape where a portion of an entire section of a circumference of 360 degrees may be open. The first rotation guide protrusion portion 184 as shown in FIG. 21 may be provided on the rear side of a central portion of the front portion of the base panel 111*d*, and may have a concave circular arc shape. A length of the circular arc may be a circular arc section substantially between 30 degrees to 60 degrees of the overall length of the circumference.

One portion of the second rotation guide protrusion portion 184*b* may have a circular arc shape having a predetermined curvature between the central portion of the front portion of the base panel 111*d* and the first rotation guide protrusion portion 184*a*. A length of the circular arc may be a circular arc section of about 180 degrees of the overall length of the circumference. Another portion of the second rotation guide protrusion portion 184*b* may be positioned in front of the central portion of the front portion of the base panel 111*d* and may have a convex circular arc shape. A length of the circular arc may be a circular arc section substantially between 45 degrees to 90 degrees of the overall length of the circumference. The one portion and another portion of the second rotation guide protrusion portion 184b may be provided to face each other and may be connected to each other by a connector having a vertically crossing shape. The angle of the circular arc section is not limited to the aforementioned angle.

In order to allow the rotary ring 190 to maintain a predetermined height and rotate, an installation portion 185 may be provided together with the rotation guide protrusion portion 184. The installation portion 185 may protrude horizontally from a lower surface of the base panel 111d, and a lower surface of the rotary ring 190 may be supported in contact with the installation portion 185. The installation portion 185 may include a first installation portion and a second installation portion that may be concentric. Accordingly, the rotary ring 190 may be rotated while being maintained at a predetermined height.

The first installation portion may protrude from a rear surface of the first rotation guide protrusion portion 184 and may also be formed in a front end portion of the base panel 111d on an opposite side of the first rotation guide protrusion portion 184. The first installation portion may have a same curvature as a curvature of the first rotation guide protrusion portion 184. The first installation portion may protrude upwardly from a lower surface of the base panel 111d, and an upper portion of the first installation may be a horizontal plane and allow a portion of the rotary ring 190 to be mounted thereon. The second installation portion may protrude from a rear surface of a portion of the second rotation guide protrusion portion 184b and may protrude from a front surface of another portion of the second rotation guide protrusion portion 184b. A plurality of second installation portions may be spaced apart from one another.

The rotary ring 190 may be guided by the rotation guide protrusion portion 184 and rotatably installed on the base panel 111d and may support the residual water tray 180. The rotary ring 190 may include an outer ring portion 191, an inner ring portion 192, and a ring joint portion 193. The outer ring portion 191 may form an external framework and a shape of the rotary ring 190. The outer ring portion 191 may have a circular shape, and a portion of the outer ring portion 191 may come into contact with an outer surface of the first rotation guide protrusion portion 184a and may be rotatably installed along the first rotation guide protrusion portion 184a. The rotary ring 190 may be configured to rotate at a same position in relation to the central portion of the front portion of the base panel 111d. The inner ring portion 192 may be provided to rotatably support the outer ring portion 191 such that the rotary ring 190 may not be moved from the central portion of the base panel 111d.

Figure 20:
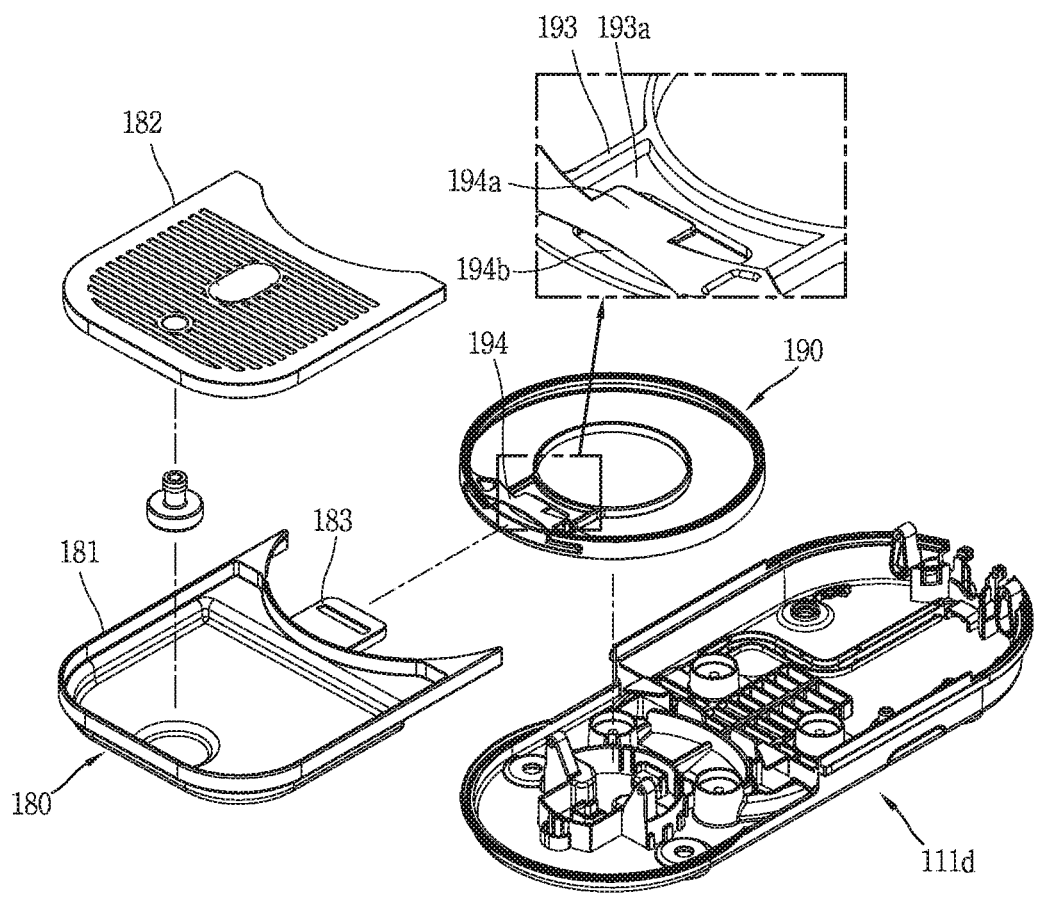
FIG. 20 is an exploded perspective view of the base panel of FIG. 19.
Figure 22:
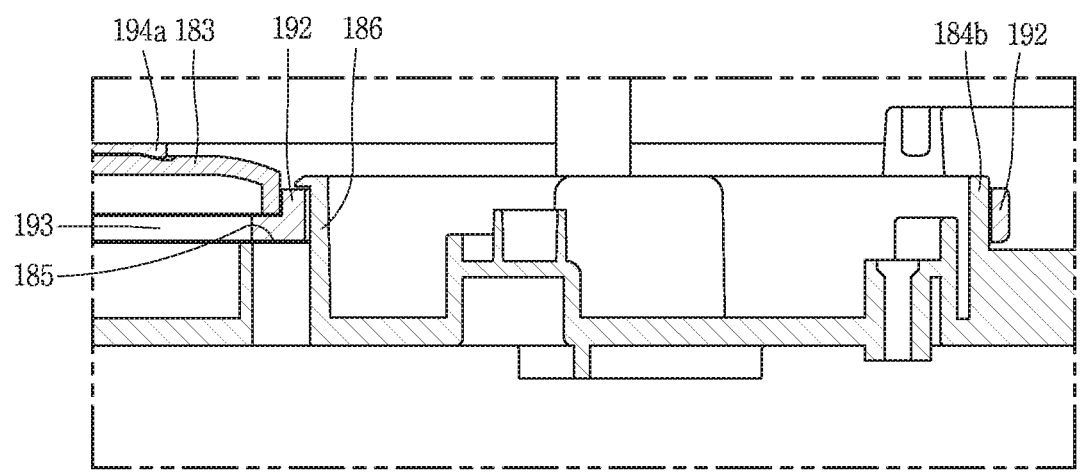
FIG. 22 is a cross-sectional view taken based upon XXII-XXII in FIG. 21.

Without the inner ring portion 192 in the structure of the first rotation guide protrusion portion 184a and the first installation portion shown in FIG. 20 to FIG. 22, there may be no support structure to prevent the outer ring portion 191 from moving backwards from the first rotation guide protrusion portion 184a, and the first installation portion may not be present. Thus, the outer ring portion 191 may be moved to the rear side of the water dispenser.

In order to prevent this, a separate support structure to support the center of the outer ring portion 191 may be required. The inner ring portion 192 may be provided to be concentric with the outer ring portion 191. The inner ring portion 192 may have a circular shape, may contact outer surfaces of one portion and another portion of the second rotation guide protrusion portion 184b to limit movement of the water dispenser and the base panel 111d in a forward/backward direction, and may be guided by the second rotation guide protrusion portion 184b so as to be rotatable at a same position.

Since the rotary ring 190 has a concentric dual-ring structure including the outer ring portion 191 and the inner ring portion 192, when a lower portion of the residual water tray 180 is supported only by the rotary ring 190, rather than being in contact with the installation position, for example, a kitchen counter, or a table, bearing power for the residual water tray 180 may be secured to tolerate a load of the residual water tray 180.

In order for the outer ring portion 191 to be coupled with the residual water tray 180, the outer ring portion 191 may have an installation portion 194 provided on one side thereof. The installation portion may include an accommodation hole 194b having a same size and shape as those of the coupling portion 183. The accommodation hole 194b may be open in a direction facing the coupling portion 183 to allow the coupling portion 183 to be insertedly coupled to the installation portion 194 therethrough. When the coupling portion 183 is insertedly coupled to the interior of the installation portion 194, the installation portion 194 may cover the coupling portion 183, may be in contact with an outer surface of the coupling portion 183, and may support the coupling portion 183 such that the coupling portion 183 may not move in vertical and horizontal directions. However, the coupling portion 183 may be movable in a forward/backward direction within the installation portion 194 and may be inserted and drawn out.

A support rib 194a may protrude in a backwards direction from an upper surface of the installation portion 194. Thus, when the coupling portion 183 is inserted, a lower surface of the support rib 194a may be in contact with and support an upper surface of the coupling portion 183 to increase bearing power with respect to the coupling portion 183. A protrusion may be formed on a lower surface of the support rib 194a and a fastening recess 183a may be formed on an upper surface of the coupling portion 183. Thus, when the coupling portion 183 is inserted into the installation portion 194, the protrusion may be insertedly fastened to the fastening recess 183a. When the protrusion and the fastening recess 183a are coupled to each other or separated from each other, a clicking sound may be made so that the user may easily recognize whether the coupling portion 183 is coupled to or separated from the installation portion 194.

The outer ring portion 191 and the inner ring portion 192 may be connected by the ring joint portion 193. The ring joint portion 193 may extend from a lower portion of the installation portion to the inner ring portion 192 so as to be horizontal. The ring joint portion 193 may have a recess portion 193a formed to be concave therein. The recess portion 193a may contact side surfaces of the coupling portion 183 when the coupling portion 183 is inserted to guide insertion of the coupling portion 183 and support side surfaces of the coupling portion 183. Accordingly, the coupling portion 183 may be easily insertedly coupled to the installation portion 194. As the coupling portion 183 is insertedly coupled to the installation portion 194, the residual water tray 180 may be coupled to the rotary ring 190 and rotate in a horizontal direction with respect to the base panel 111d.

A release preventing protrusion 186 may be formed in the second rotation guide protrusion portion 184b to prevent the rotary ring 190 from being released from the second rotation guide protrusion portion 184b. An upper end portion of the release preventing protrusion 186 may have a hook shape so as to be caught by an upper surface of the inner ring portion 192. Side surfaces of the release preventing protrusion 186 may be cut out from a portion of the rotation guide protrusion portion 184. Thus, when the residual water tray 180 rotates, the rotary ring 190 may be lifted in an upward direction to prevent the rotary ring 190 from being released from the second rotation guide protrusion portion 184*b*, whereby rotation of the residual water tray 180 may be stably maintained.

According to embodiments disclosed herein, a water dispenser may include a water discharge port, a water discharger, and a residual water tray that may freely change position. A water dispenser in which a water discharger may be able to be smoothly rotated at a uniform speed without causing a feeling that the water discharger may be stuck. A water dispenser may prevent or restrain wearing of a component such as an O-ring.

A position of the water discharger may be easily changed by rotating the water discharger in a horizontal direction without having to be separated from the main body. Thus, spatial restrictions may be minimized when the water dispenser is installed. When the user applies a force having a predetermined magnitude or greater to the water discharger, the water discharger may be smoothly rotated at a uniform speed so that the water discharger does not feel as if it may be stuck. Accordingly, operating a product may be smooth and may contribute to a high quality product.

Since the second water discharge pipe fixed with respect to the rotary first water discharge pipe and may be formed of stainless steel having a low level of surface roughness, wearing of the O-ring within the pipe fitting may be reduced. Water leakage caused as the O-ring is worn down may be minimized, and a durability problem of a component may be resolved to enhance reliability of the product. A length of time between replacement may be extended, and costs for replacing a component and maintenance may be reduced.

Embodiments disclosed herein provide a water dispenser which may include a main body; a rotator installed to be rotatable in a horizontal direction in the main body and including a water discharger; a rotation guide rail having a predetermined curvature within the main body; and a rotation guide protrusion provided in the rotator and slidably coupled to the rotation guide rail to guide rotation of the rotator.

Embodiments disclosed herein provide a water dispenser which may include a main body; a rotator installed to be rotatable in a horizontal direction in the main body and including a water discharger; and a residual water tray rotatably provided below the main body. The main body may include a base panel including a rotation guide protrusion portion having a predetermined curvature; and a rotary ring including an installation portion provided on one side thereof and a portion rotatably installed in the base panel along the curvature of the rotation guide protrusion portion, wherein the residual water tray may have a coupling portion detachably coupled to the installation portion and may be coupled to the rotary ring through the coupling portion so as to be rotatable in a horizontal direction with respect to the base panel. A water dispenser may further include an oil damper that absorbs rotational kinetic energy of the rotator, wherein the oil damper may include a damper housing to store oil; and a rotor connected to a pinion gear and rotatably installed within the damper housing.

Embodiments disclosed herein provide a water dispenser which may include a main body; a rotator installed to be rotatable in a horizontal direction in the main body and including a water discharge port; a first water discharge pipe configured to be aligned with a rotational axis of the rotator within the main body and formed of stainless steel; a second water discharge pipe connected to the water discharge port and provided in a direction crossing the first water discharge pipe within the rotator; a pipe fitting configured to connect the first water discharge pipe and the second water discharge pipe and rotate with the rotator; and an O-ring provided within the pipe fitting to make the pipe fitting and the first and second water discharge pipes airtight.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
    a main body including a cabinet having a front cover that forms a front surface and side panels that form side surfaces;
    a support provided within the main body;
    a rotation guide rail having a predetermined curvature and provided above the support; and
    a rotator including a liquid discharger provided on one side thereof and having a rail accommodation recess spaced apart from a rotation center in a radial direction and coupled to the rotation guide rail,
    an internal gear provided in an upper portion of the support, spaced apart in a radial direction from the rotation guide rail, and having a predetermined curvature; and
    a pinion gear provided on one side of the rotator, coupled to the internal gear, and that rotates along the internal gear when the rotator rotates,
    wherein the pinion gear includes an oil damper that absorbs rotational kinetic energy of the rotator, the oil damper including:
    a damper housing to store oil; and
    a rotator connected to the pinion gear and rotatably provided within the damper housing.

2. The liquid dispenser of claim 1,
    wherein the rotation guide rail includes a first rotation guide rail provided on an inner side of an upper end portion of the support, and
    wherein a rotation guide protrusion protrudes from one side of the rail accommodation recess and is coupled to the first rotation guide rail.

3. The liquid dispenser of claim 2, wherein the rail accommodation recess is provided in a position of a predetermined radius from a rotation center of the rotator, the liquid discharger is formed in a position farther than the rail accommodation recess from the rotation center of the rotator, and the first rotation guide protrusion is provided to have a predetermined length on a line that connects the liquid discharger from the rotation center of the rotator.

4. The liquid dispenser of claim 1, wherein the rotator includes:
   a rotator housing; and
   a plurality of guide brackets fixed to an inner side of the rotator housing,
   wherein the plurality of guide brackets each includes a rail accommodation recess configured to be concave in a circumferential direction of the plurality of guide brackets to accommodate the rotation guide rail and a rotation guide protrusion that protrudes from one side of each of the rail accommodation recesses and is coupled to the rotation guide rail.

5. The liquid dispenser of claim 4, wherein the plurality of guide brackets includes an upper guide bracket and a lower guide bracket spaced apart from each other and fixed to an upper portion and a lower portion, respectively, of the inner side of the rotator housing, and
   an upper rail accommodation recess or a lower rail accommodation recess formed respectively in the upper guide bracket or the lower guide bracket, and a rotation guide protrusion provided in the upper rail accommodation recess or the lower rail accommodation recess.

6. The liquid dispenser of claim 2, wherein an end portion of the rotation guide protrusion has a hook shape and couples to the rotation guide rail by overlapping the rotation guide rail in a thickness direction.

7. The liquid dispenser of claim 2, wherein the rotation guide rail further includes a second rotation guide rail that protrudes from an inner surface of the front cover and is spaced apart from the first rotation guide rail in a vertical direction, and wherein the rotator includes:
   a rotator housing;
   an upper guide bracket and a lower guide bracket spaced apart from each other and fixed to an upper portion and a lower portion, respectively, on an inner side of the rotator housing; and
   the rotation guide protrusion includes a second rotation guide protrusion that protrudes from the upper guide bracket and couples to the second rotation guide rail.

8. The liquid dispenser of claim 1, wherein the rotation guide rail has a circular arc shape, and end portions of the rotation guide rail are open to allow the rotation guide protrusion to be inserted in a rotation direction of the rotator so as to be coupled to the rotation guide rail.

9. The liquid dispenser of claim 1, wherein the rotor is connected to the pinion gear by a rotational shaft that penetrates vertically through the central portion of the damper housing and overlaps the pinion gear in a direction of the rotational shaft.

10. The liquid dispenser of claim 1, wherein a portion of an outer surface of the rotor is spaced apart from the damper housing with a gap provided therebetween, and when the rotor rotates, oil is leaked out through the gap to dampen a rotational force of the rotor.

11. The liquid dispenser of claim 1, wherein the rotor includes an oil passage such that oil passes through the oil passage when the rotor rotates.

12. The liquid dispenser of claim 1, wherein the internal gear has a circular arc shape, and the first rotation guide rail and the internal gear are provided to be concentric.

13. A liquid dispenser, comprising:
   a main body including a cabinet having a front cover that forms a front surface and side panels that form side surfaces;
   a support provided within the main body;
   a rotation guide rail having a predetermined curvature and provided above the support; and
   a rotator including a liquid discharger provided on one side thereof and having a rail accommodation recess spaced apart from a rotation center in a radial direction and coupled to the rotation guide rail,
   wherein the rotator further includes a positioning device that limits the liquid discharger to a specific position, the positioning device including:
   at least one positioner provided in the support or the rotator; and
   at least one stop protrusion that protrudes from the rotator or the support in a direction in which the stop protrusion faces the positioner and is configured to couple to the positioner, and
   wherein one end portion of the at least one stop protrusion is elastically supported so as to be vertically movable, and when the stop protrusion is positioned to face the positioner, the stop protrusion is insertedly coupled to the positioner.

14. The liquid dispenser of claim 13, wherein the positioning device is provided in plurality, and the plurality of positioning devices are spaced apart from each other in a circumferential direction of the rotator.

15. The liquid dispenser of claim 2, wherein the rotation guide protrusion is formed of a material different from a material of the rotation guide rail and is formed of polyoxymethylene (POM).

16. The liquid dispenser of claim 1, wherein the liquid discharger includes:
   a liquid discharger housing that protrudes from one surface of the rotator; and
   a liquid discharge port provided at an end portion of the liquid discharger housing.

17. A liquid dispenser, comprising:
   a main body including a cabinet having a front cover that forms a front surface and side panels that form side surfaces;
   a support provided within the main body;
   a rotation guide rail having a predetermined curvature and provided above the support; and
   a rotator including a liquid discharger provided on one side thereof and having a rail accommodation recess spaced apart from a rotation center in a radial direction and coupled to the rotation guide rail; and
   an operation module which rotates with the rotator, the operation module being disposed on a top surface of the main body and above the front cover,
   wherein the front cover includes:
   a first front cover that forms a front surface of the liquid dispenser,
   a second front cover provided to be spaced apart from the first front cover, and
   an opening provided between the first front cover and the second front cover, and
   wherein the liquid discharger protrudes through the opening and rotates in a horizontal direction of the front cover,
   wherein the rotator includes:
   a rotator housing, and
   a guide bracket provided within the rotator housing, and wherein a coupling protrusion protrudes from the guide bracket, and a coupling hole is provided on a lower surface of the operation module and coupled to the coupling protrusion.

18. The liquid dispenser of claim 17, wherein the operation module includes:
an upper housing;
a lower housing fastened to the upper housing by a fastener; and
an accommodation space formed between the upper housing and the lower housing as the upper housing and the lower housing are fastened to accommodate a printed circuit board.

\* \* \* \* \*